United States Patent [19]

Kuo et al.

[11] 4,228,276

[45] Oct. 14, 1980

[54] DIRECT PRECIPITATION METHOD FOR PRODUCING EXTRUSION-GRADE CELLULOSE ACETATE POWDER AND RESULTING PRODUCT

[75] Inventors: Chung-Ming Kuo; Richard T. Bogan, both of Kingsport, Tenn.

[73] Assignee: Eastman Kodak Company, Rochester, N.Y.

[21] Appl. No.: 24,281

[22] Filed: Mar. 26, 1979

[51] Int. Cl.$^3$ .......................... C08B 3/06; C08B 3/22
[52] U.S. Cl. ..................................... 536/76; 536/69; 536/82
[58] Field of Search ........................... 536/76, 69, 82

[56] References Cited

U.S. PATENT DOCUMENTS

| | | | |
|---|---|---|---|
| 1,275,884 | 8/1918 | Esselen et al. | 536/82 |
| 2,180,009 | 11/1939 | Malm | 536/76 |
| 2,489,143 | 11/1949 | Kneisley | 536/76 |
| 2,772,267 | 11/1956 | Malm et al. | 536/76 |
| 2,775,529 | 12/1956 | Bates et al. | 536/76 |
| 2,816,888 | 12/1957 | Lamborn | 536/82 |
| 2,843,583 | 7/1958 | Voris | 106/198 |
| 2,849,441 | 8/1958 | Steinmann | 536/82 |
| 2,891,946 | 6/1959 | Volberg et al. | 536/82 |
| 3,824,108 | 7/1974 | Stoetzer et al. | 106/198 |

*Primary Examiner*—Ronald W. Griffin
*Attorney, Agent, or Firm*—Malcolm G. Dunn; Daniel B. Reece, III

[57] ABSTRACT

Improved method for preparing cellulose acetate powder, particularly extrusion-grade powder, by direct precipitation, with the precipitation step occurring at a temperature of about 65° C. to about 95° C. and with the coagulating agent subsequently being removed from the resulting liquid powder slurry also at a temperature of about 65° C. to about 95° C.; and the cellulose acetate powder product resulting from the improved method, the powder being particularly adapted to take up plasticizer up to about 50 percent by weight and still flow uniformly without caking or becoming tacky.

16 Claims, No Drawings

DIRECT PRECIPITATION METHOD FOR PRODUCING EXTRUSION-GRADE CELLULOSE ACETATE POWDER AND RESULTING PRODUCT

BACKGROUND OF THE INVENTION

The present invention is directed to an improved method for producing cellulose actetate powder, particularly extrusion-grade cellulose acetate powder, the improved method involving producing the powder in the form of small coagulate particles directly from precipitation, and to the product produced by the method.

For purposes of this disclosure, by "extrusion-grade cellulose acetate powder", it is meant that after the addition of a liquid plasticizer, the powder is characterized by being dry and free-flowing, and is of a suitable tapped bulk density so that it flows uniformly through feed tubes and feed hoppers to an extruder, without becoming caked or without sticking together in clumps or without bridging over a feed hopper opening and thus stopping further flow into an extruder.

In the prior art, cellulose acetate powder in general has been produced by different methods, some methods including grinding cellulose acetate flake into powder; precipitating directly into a powder; however, such powder is usually not suitable for use an extrusion-grade powder because it cakes after liquid plasticizer is added; and precipitating into pellets and then the pellets in a subsequent step are milled to a powder, which may then be suitable for use as an extrusion-grade powder.

An example of a direct powder precipitation process is disclosed in U.S. Pat. No. 2,891,946 (issued June 23, 1959). This process, however, is generally not considered suitable for producing extrusion-grade powder because after the addition of a liquid plasticizer, the cellulose acetate powder then tends not to have free-flowing characteristics.

An example of a product resulting from precipitation of cellulose acetate into pellets and then milling the pellets into powder is the one identified as EASTMAN Cellulose Acetate E-400-25X, a product of Eastman Chemical Products, Inc., a subsidiary of Eastman Kodak Company. The latter product has an average acetyl content (as disclosed in Eastman Technical Data Sheet TDS No. E-131 "EASTMAN Cellulose Acetate for Extrusion Compounding") of about 39.9%, a falling ball viscosity range (as determined by ASTM Method D-1343 in the solution described as Formula A, ASTM Method D-871) of about 17 to about 35 seconds, and a tapped bulk density of about 33 pounds per cubic foot.

The powder particles of the product, EASTMAN Cellulose Acetate E-400-25X, will take up plasticizer up to about 50 percent by weight of the powder particles. For instance, some industrial concerns may blend 52 parts plasticizer with one hundred parts cellulose acetate powder.

The laterally described milled powder particle has a pore volume of about 0.52 to about 0.69 cubic centimeters per gram, and a surface area of about 11 to about 31 square meters per gram, as measured by an independent laboratory, the Materials Analysis Laboratory of Micromeritics Instrument Corporation in Norcross, Georgia.

Whereas the powder particles of the preceding described product are the result of a milling or grinding step, the powder product of the present invention comprises small coagulate particles, generally of a size that will pass through a 45 mesh screen. For instance, some samples of the coagulate powder particles have been found to have a pore volume of about 2.15 cubic centimeters per gram, and a surface area of about 37.4 square meters per gram, as measured by the aforementioned independent laboratory, the Materials Analysis Laboratory of Micromeritics Instrument Corporation in Norcross, Georgia.

The surface area of the coagulate powder particles is substantially porous and is essentially free of fused or smooth surfaces so as to more readily take up plasticizer. When the coagulate powder particles are sliced open to reveal the interior surface, it, too, is found to be substantially porous and essentially free of fused or smooth surfaces.

The coagulate powder particles of the disclosed invention also will take up plasticizer up to about 50 percent by weight of the coagulate powder particles, without the powder particles sticking or clumping and thereby preventing uniform flow of the powder particles to an extruder.

An object of the invention, therefore, is to provide an improved method for producing extrusion-grade cellulose acetate powder by direct precipitation, thus eliminating the need for a subsequent milling or grinding step.

Another object is to provide an improved extrusion-grade cellulose acetate powder resulting from the improved method, the powder being formed of small coagulate particles having a large pore volume and surface area.

Other objects inherent in the nature of the method and product will become evident from this disclosure to those skilled in this art.

SUMMARY OF THE INVENTION

The improved method of the invention includes preparing cellulose acetate powder from an acid dope containing from about 6 to about 15% by weight cellulose acetate ester, the acid dope comprising about 60 to about 100 percent aqueous acetic acid solution and a cellulose acetate ester dissolved in the solution and having an acetyl content of about 38 to about 41 weight percent. A water immiscible coagulating agent of about 0.25 to about 5.0 parts per part cellulose acetate ester is mixed in the dope to form a mixture, with the water immiscible coagulating agent having a boiling point less than 150° C.

The cellulose acetate ester is next precipitated from the mixture in about 25% to about 35% aqueous acid at a higher temperature than in the prior art, a temperature of about 65° C. (about 149° F.) to about 95° C. (about 203° F.), by adding at a rate slow enough to prevent localized precipitation about 5% to about 12% aqueous acetic acid solution that is preheated to the same temperature as the acid dope while vigorously agitating the mixture sufficiently to keep large coagulate particles apart into smaller coagulate particles of a size that will pass through a 45 mesh screen so as to form a liquid powder slurry.

The liquid powder slurry is next aged for about 15 minutes in about 25% to about 35% aqueous acetic acid.

Then, what is also different from the prior art, the coagulating agent is removed from the liquid powder slurry down to about 1% or less by weight of the liquid powder slurry, and at a temperature of about 65° C. (about 149° F.) to about 95° C. (about 203° F.).

The liquid is then removed from the liquid powder slurry after the preceding step so as to obtain a wet powder of coagulate particles.

The wet powder is washed with water to remove the residual acetic acid; and then the powder is dried at a temperature of about 65° C. to about 95° C. to remove the water.

The water immiscible coagulating agent may be selected from esters prepared from aliphatic acids having up to six carbon atoms, the acids being esterified with alcohols of six carbon atoms or less. Such water immiscible coagulating may be an ester selected from ether acetate, isopropyl acetate, n-propyl acetate, butyl acetate (n- and sec-butyl), n- and sec-amyl acetate, hexylacetate n-butyl propionate and ethyl butyrate.

The water immiscible coagulating agent may also be selected from alkyl and aryl chlorides having from one to six carbon atoms. These may be selected from methylene chloride, ethylene chloride, n-butyl chloride, amyl chloride, propylene chloride, chloroform and chlorobenzene.

The water immiscible coagulating agent may further be a hydrocarbon containing from six to eight carbon atoms. These may be selected from benzene, toluene and xylene.

The acid dope may contain about 10% to about 12% by weight cellulose acetate ester dissolved in about 70% aqueous acetic acid at a temperature of about 80° C. to about 85° C.

The cellulose acetate ester may also be precipitated from the mixture in about 30% aqueous acetic acid at a temperature of about 80° C. to about 85° C. by slowly adding to the mixture about 10% aqueous acetic acid solution while vigorously agitating the mixture to form the liquid powder slurry, the liquid powder slurry being aged for about 15 minutes in the about 30% aqueous acetic acid. About 0.25 to about 2.0 parts of the water immiscible coagulating agent per part of cellulose acetate ester are mixed, the preferred amount being about 0.5 to about 1.0 parts of the water immiscible coagulating agent per part of cellulose acetate ester, with the preferred coagulating agent being selected from ethyl acetate, isopropyl acetate, butyl acetate (n- and sec-butyl), n-propyl acetate, toluene, benzene and xylene.

The improved cellulose acetate powder has an intrinsic viscosity, in accordance with ASTM D-871 testing method, of about 0.75 to about 2.0 and an acetyl range of about 38 to about 41 weight percent. The powder comprises coagulate particles of a size that will pass through about a 45 mesh screen and have free-flow characteristics suitable for use in an extruder. Each of the coagulate powder particles has an exterior and interior surface (the latter is revealed when sliced open) that are substantially porous and essentially free of fused surfaces. The cellulose acetate powder has a tapped bulk density of at least about 17 to about 26 pounds per cubic foot with somewhat higher bulk densities being possible as a consequence of the washing, dewatering and drying operations, and is capable of taking up to about 50% by weight plasticizer without the coagulate particles becoming tacky and nonfreeflowing.

Preferably, the cellulose acetate powder has an intrinsic viscosity, in accordance with ASTM D-871 testing method, of about 0.9 to about 1.5 and an acetyl range of about 39 to about 40 weight percent.

The pore volume of the coagulate powder particles of the improved cellulose acetate powder is about 2.00 cubic centimeters per gram, and the surface area is at least 15 square meters per gram, and some have been found to be about 37 square meters per gram.

For purposes of this invention, "tapped bulk density" equals the weight of powder in grams times 0.624 times 100 divided by the volume of powder in milliliters after compaction. It is defined as the apparent density of a powder obtained when the receptacle in which it is poured, such as a graduated cylinder, is tapped or vibrated during loading under conditions such as specified in ASTM B-527.

The cellulose acetate powders of the present invention, after the plasticizer addition, are useful in the preparation of extruded sheeting and film products.

DESCRIPTION OF THE PREFERRED EMBODIMENT

The process and the product of the invention are best illustrated by the following examples:

EXAMPLE 1

Cellulose acetate having approximately 40% acetyl by weight (ASTM D-871) and 25 seconds viscosity (ASTM D-1343) and hereinafter identified as "CA-400-25", was dissolved in 70% aqueous acetic acid at 80° C. to 85° C. to prepare an acid dope containing 10 to 12 weight percent of ester. The acid dope was then mixed with varying amounts (0.25 to 2.0 parts per part of ester) of isopropyl acetate, hereinafter identified as "IPA"; the resulting mixture was subsequently precipitated in 30% aqueous acetic acid at about 80° C. to about 85° C. by slowly adding aqueous acetic acid (10% acid), which was preheated to the same temperature as that of the acid dope, while being vigorously agitated to prevent localized precipitation. The precipitation powders or resulting slurry were aged in the 30% aqueous acetic acid for 15 minutes. The IPA at about 80° C. to about 85° C. temperature was removed by vacuum down to about 1% or less of the liquids, the remaining material was then washed and dried in a forced-air oven at about 80° C. to about 85° C. to remove the last traces of moisture.

Each sample of the acetate powders was evaluated for its plasticizability by dry blending 2 parts of ester with 1 part of a plasticizer such as one comprising about 72 weight percent of diethyl phthalate, about 22 weight percent of dimethyl phthalate and about 5 weight percent of 2,2,4-trimethyl pentane-1,3-diol diisobutyrate in a rotary vacuum evaporator at about 80° C. to about 85° C. The plasticizability of the esters was then determined qualitatively by the amount of drying time needed to produce a free-flowing powder. Control samples based on the cellulose acetate powder of the aforementioned U.S. Pat. No. 2,891,946 were similarly evaluated. The following data illustrate the excellent plasticizability of the acetate powders produced by the methods of this invention.

| IPA/Ester (part/part) | Precipitation Temperature (°C.) | Tapped Bulk Density (lb./ft.$^3$) | Plasticizability[1] |
|---|---|---|---|
| 0.25 | 80–85 | 12–16 | Good |
| 0.50 | 80–85 | 20–22 | Excellent |
| 1.0 | 80–85 | 20–23 | Excellent |
| 2.0 | 80–85 | 20–24 | Excellent |

Control Sample - U.S. Pat. No. 2,891,946

| IPA/Ester (part/part) | Precipitation Temperature (°C.) | Tapped Bulk Density (lb./ft.³) | Plasticizability[1] |
|---|---|---|---|
| 0.75 | 17–21 | 20–22 | Poor |

[1] Excellent - < 5 minutes to dry free-flowing powder
Good - < 10 minutes to dry free-flowing powder
Acceptable - < 15 minutes to dry free-flowing powder
Poor - > 15 minutes to dry free-flowing powder

EXAMPLE 2

Cellulose acetate powders were prepared in a manner similar to that described in Example 1, except that the precipitation temperature is reduced to approximately 60° C. The products had excellent plasticizability but the tapped bulk density is lower (13 to 17 lb./ft.³). For any level of plasticizability, the higher the bulk density of the acetate powder the better the free-flowing characteristics of the plasticized ester. Therefore, the free-flowing characteristics of the powders produced by using the lower precipitation temperatures are generally poorer than those of the powders produced in Example 1.

EXAMPLE 3

Cellulose acetate (CA-400-25) was dissolved in 70% aqueous acetic acid at 80° C. to 85° C. to prepare an acid dope containing 10 to 12 weight percent of ester. The acid dope was then mixed with varying amounts of a coagulating agent (0.5 to 5.0 parts per part of ester) and subsequently precipitated in 30% aqueous acetic acid at 80° C. to 85° C. by slowly adding aqueous acetic acid (10%), preheated to the same temperature as that of the acid dope, to the vigorously agitated acid dope. Before cooling the mixture, the coagulating agent was removed by evaporation and the precipitated acetate was separated from the 30% aqueous acetic acid using filtration. The precipitated powders were then washed free of residual acid and dried in a forced-air oven at 65° C. to 95° C. to remove the last traces of moisture.

Each of the acetate powders was evaluated for its rate of plasticizer uptake and its free-flowing characteristics as a plasticized powder by dry blending two parts of ester with one part of the plasticizer in a rotary vacuum evaporator at 80° C. to 85° C. The processability of the ester as an extrusion-grade acetate powder was then determined qualitatively by recording the amount of time needed to produce a free-flowing powder. The following data illustrates the excellent processability of the acetate powders produced by the method of this invention.

| Coagulating Agent | Concentration of Coagulating Agent (Part/Part of Ester) | Tapped Bulk Density (Lb./Ft.³) | Processability* (Pz Uptake and Free-Flowing Characteristics) |
|---|---|---|---|
| Isopropyl Acetate | 0.50 | 20–22 | Excellent |
| Isopropyl Acetate | 1.00 | 20–23 | Excellent |
| Isopropyl Acetate | 2.00 | 20–24 | Excellent |
| Ethyl Acetate | 5.00 | 20 | Excellent |
| Ethyl Butyrate | 1.00 | 19 | Excellent |
| Butyl Acetate | 1.00 | 23 | Good |
| Methylene Chloride | 1.00 | 18 | Excellent |
| Butyl Chloride | 0.50 | 19 | Excellent |
| Toluene | 1.00 | 20 | Excellent |
| Xylene | 1.00 | 22 | Acceptable |

*Processability:
Excellent - < 5 minutes to dry free-flowing powder
Good - < 10 minutes to dry free-flowing powder
Acceptable - < 15 minutes to dry free-flowing powder
Poor - > 15 minutes to dry free-flowing powder

EXAMPLE 4

Cellulose acetate powders were prepared in a manner similar to that described in Example 3, except that the precipitation temperature is reduced to 60° C. The products had excellent plasticizer uptake, but the free-flowing characteristics of the plasticized powders were poor because of the lower bulk densities (13 to 17 lb./ft.³). Thus, for any level of plasticizer uptake, acetate powders having higher bulk density generally provided better overall processability.

EXAMPLE 5

Cellulose acetate powder was prepared in a manner similar to that described in Example 3, except that the amount of coagulating agent was less than 0.5 part per part of ester. The product had excellent plasticizer uptake but its processability as extrusion grade powder was poor due to its low bulk density (12 to 16 lb./ft.³).

EXAMPLE 6

Cellulose acetate powders were prepared in a manner similar to that described in Example 3, except that the precipitated powders were not separated from the aqueous acetic acid (30%) until after the mixture containing the coagulating agent was cooled to room temperature (25° C.). The product had a high bulk density (23 to 26 lb./ft.³) but its processability was unsatisfactory because of its poor plasticizer uptake.

EXAMPLE 7

Cellulose acetate powders were prepared in a manner similar to that described in Example 6, except that the precipitation temperature was 50° C. to 60° C. The products had bulk density of 21 to 22 lb./ft.³, but the processability as extrusion-grade cellulose acetate powders was poor because of their poor plasticizer uptake.

EXAMPLE 8

Cellulose acetate powders were prepared in a manner similar to that described in Example 3, except that the cellulose acetate was CA-394-30 [a cellulose acetate having approximately 39.4% acetyl by weight (ASTM D-871) and 30 seconds viscosity (ASTM D-1343)]. The product had tapped bulk density in the range of 20 to 22 lb./ft.³ and good processability.

The invention has been described in detail with particular reference to preferred embodiments thereof, but it will be understood that variations and modifications can be effected within the spirit and scope of the invention.

We claim:

1. Method for preparing cellulose acetate powder from an acid dope containing from about 6% to about 15% by weight cellulose acetate ester, the acid dope comprising about 60 to about 100 percent aqueous acetic acid solution and a cellulose acetate ester dissolved in the solution and having an acetyl content of about 38 to about 41 weight percent; the method comprising:
(a) mixing in the dope about 0.25 to about 5.0 parts per part of cellulose acetate ester of a water immiscible coagulating agent having a boiling point less than 150° C. (302° F.) to form a mixture;
(b) precipitating from the mixture the cellulose acetate ester in about 25% to about 35% aqueous acid at a temperature of about 65° C. (149° F.) to about 95° C. (203° F.) by adding at a rate slow enough to prevent localized precipitation about 5% to about 12% aqueous acetic acid solution that is preheated to the same temperature as the acid dope while vigorously agitating the mixture sufficiently to keep large coagulate particles apart into smaller coagulate particles of a size that will pass through a 45 mesh screen so as to form a liquid powder slurry;
(c) aging the liquid powder slurry for about 15 minutes in about 25% to about 35% aqueous acetic acid;
(d) removing the coagulating agent from the liquid powder slurry down to about 1% or less by weight of the liquid powder slurry and at a temperature of about 65° C. to about 95° C.;
(e) removing liquid from the liquid powder slurry remaining after step (d) to obtain a wet powder of coagulate particles;
(f) washing the wet powder with water to remove the residual acetic acid; and drying the powder at a temperature of about 65° C. to about 95° C. to remove the water.

2. Method as defined in claim 1, wherein the water immiscible coagulating agent is selected from esters prepared from aliphatic acids having up to six carbon atoms and alcohols of up to six carbon atoms.

3. Method as defined in claim 2, wherein said ester is selected from ethyl acetate, isopropyl acetate, n-propyl acetate, butyl acetate (n- and sec-butyl), n- and sec-amyl acetate, hexylacetate n-butyl propionate and ethyl butyrate.

4. Method as defined in claim 1, wherein the water immiscible coagulating agent is selected from alkyl and aryl chlorides having from one to six carbon atoms.

5. Method as defined in claim 4, wherein said chlorides are selected from methylene chloride, ethylene chloride, n-butyl chloride, amyl chloride, propylene chloride, chloroform and chlorobenzene.

6. Method as defined in claim 1, wherein the water immiscible coagulating agent is selected from a hydrocarbon containing from six to eight carbon atoms.

7. Method as defined in claim 6, wherein said hydrocarbon is selected from benzene, toluene, and xylene.

8. Method as defined in claim 1, wherein the acid dope contains about 10% to about 12% by weight cellulose acetate ester dissolved in about 70% aqueous acetic acid at a temperature of about 80° C. (176° F.) to about 85° C. (185° F.).

9. Method as defined in claim 8, wherein the cellulose acetate ester is precipitated from said mixture in about 30% aqueous acetic acid at a temperature of about 80° C. (176° F.) to about 85° C. (185° F.) by slowly adding to the mixture about 10% aqueous acetic acid solution while vigorously agitating the mixture to form the liquid powder slurry, the liquid powder slurry being aged for about 15 minutes in said about 30% aqueous acetic acid.

10. Method as defined in claim 9, wherein about 0.25 to about 2.0 parts of the water immiscible coagulating agent per part of cellulose acetate ester are mixed, the coagulating agent being selected from ethyl acetate, isopropyl acetate, butyl acetate (n- and sec-butyl), n-propyl acetate, toluene, benzene, and xylene.

11. Method as defined in claim 10, wherein about 0.5 to about 1.0 parts of the selected water immiscible coagulating agent defined therein per part of cellulose acetate ester are mixed.

12. An improved cellulose acetate powder having an intrinsic viscosity in accordance with ASTM D-871 testing method of about 0.75 to about 2.0 and an acetyl range of about 38 to about 41 weight percent and comprising coagulate particles that will pass through about a 45 mesh screen and have free-flowing characteristics suitable for use in an extruder, each of said coagulate particles having exterior and interior surfaces that are substantially porous and essentially free of fused surfaces, said cellulose acetate powder having a tapped bulk density of about 17 to about 26 pounds per cubic foot and being capable of taking up plasticizer up to about 50% by weight of the coagulate particles without said coagulate particles becoming tacky and caking.

13. An improved cellulose acetate powder as defined in claim 12, wherein said cellulose acetate powder has an intrinsic viscosity in accordance with said ASTM D-871 testing method of about 0.9 to about 1.5 and an acetyl range of about 39 to about 40 weight percent.

14. An improved cellulose acetate powder as defined in claim 12, wherein said coagulate particles have a surface area in excess of about 15 square meters per gram and a pore volume of about 2.0 cubic centimeters per gram.

15. An improved cellulose acetate powder as defined in claim 12, wherein the coagulate particles have a surface area of about 35 square meters per gram and a pore volume of about 2.0 cubic centimeters per gram.

16. A cellulose acetate powder prepared according to the method of claim 1.

* * * * *